United States Patent [19]

Kruseman

[11] 4,064,119
[45] Dec. 20, 1977

[54] SOLUBLE SOY PROTEIN

[75] Inventor: Jan Kruseman, Tatroz FR, Switzerland

[73] Assignee: Societe d'Assistance Technique pour Produits Nestle S.A., Lausanne, Switzerland

[21] Appl. No.: 666,226

[22] Filed: Mar. 12, 1976

[30] Foreign Application Priority Data

Mar. 27, 1976 Switzerland .......................... 3937/76

[51] Int. Cl.² ............................................... A23J 1/14
[52] U.S. Cl. .................................................. 260/123.5
[58] Field of Search ....................................... 260/123.5

[56] References Cited

U.S. PATENT DOCUMENTS 3,261,822  7/1966  Robbins et al. ................... 260/123.5
3,968,097  7/1976  Groux et al. ....................... 260/123.5

FOREIGN PATENT DOCUMENTS 484,693  7/1952  Canada.

Primary Examiner—Howard E. Schain
Assistant Examiner—W. C. Danison, Jr.
Attorney, Agent, or Firm—Watson Leavenworth Kelton & Taggart

[57] ABSTRACT

A process for the preparation of a soluble fraction of soya proteins which comprises at least partially extracting the proteins present in soya in aqueous medium at a pH value below the isoelectric point of soya proteins to obtain an acid extract of soya proteins, and neutralizing the acid extract in a time of less than about 60 seconds by the addition of alkali in a concentration of higher than about 0.1 N.

8 Claims, No Drawings

SOLUBLE SOY PROTEIN

This invention relates to a process for preparing a soluble fraction of soya proteins, in which the proteins present in soya are at least partially extracted in aqueous medium at a pH-value below the isoelectric point of soya proteins, and an acid extract of soya proteins is obtained.

Various processes for the acid extraction of proteins from vegetable seeds, especially soya, are already known. Some of these processes have been designed to separate the proteins from the other constituents which enter into solution during extraction. If the pH-value at which extraction is carried out is selected near the isoelectric point, the proteins precipitate and may readily be recovered, for example by centrifuging, and dried. A powder thus obtained is substantially insoluble. By contrast, another known process is concerned with producing pure, soluble proteins. It comprises extracting proteins from seeds in aqueous medium at a pH-value of preferably from 3.5 to 5, isolating the supernatant phase and leaving it standing in the cold to enable the proteins dissolved in it to crystallise. The yield of a process such as this is low. Yet another known process uses gel filtration in order to prevent proteins solubilised during the extraction of a soya flour by the wet method at a pH-value below 4 from being irreversibly precipitated when the solution is neutralised. A process such as this is expensive to carry out on a commercial scale.

It has now been found that it is possible to neutralise an aqueous extract of soya proteins at a pH-value below the isoelectric point to obtain a soluble fraction of soya proteins without having to resort to passage through gel columns. It has been found that there is another simple and economic means of avoiding the irreversible precipitation of soya proteins during passage into the zone of the isoelectric point and of obviating the disadvantages of conventional processes in the same way.

The present invention provides a process for the preparation of a soluble fraction of soya proteins which comprises at least partially extracting the proteins present in soya in aqueous medium at a pH value below the isoelectric point of soya proteins to obtain an acid extract of soya proteins, and neutralising the acid extract in a time of less than about 60 seconds by the addition of alkali in a concentration of higher than about 0.1 N.

The product obtained has a relatively neutral odour and flavour. It may contain in soluble form proteins representing up to approximately 80% of the total weight of the proteins present in the starting material used. The starting material used may consist for example of crushed soya cake or of defatted soya flour. The fat-extracted soya flour may have different characteristics according to the heat treatments to which it may have been subjected in order to eliminate the antitryptic factors for example. Among the commercial-grade defatted flours, it is preferred to use the white quality, in whose case the heat treatment is carried out with steam at a temperature of 100° C for example. A flour of this type may be obtained from soya flakes extracted with hexane in order to remove fats, followed by crushing. It may contain from 5 to 10% of water, approximately 50% of proteins and less than about 1% of fats.

Acid extraction of the above starting material may be carried out at a temperature below about 50° C and is preferably carried out at ambient temperature. The soya particles or flour may be suspended in water in a ratio of one part by weight to approximately 5 to 25 parts of water. It is clear that the greater the degree of dissolution, the better will be the coefficient of extraction. However, it must remain within the limits of a viable process and a ratio of approximately 1:10 is recommendable from every aspect. Extraction is preferably carried out at a pH-value of from 1.5 to 3.5. This pH-value may be reached by the addition of phosphoric acid for example. The extraction yield undergoes relatively little variation at temperatures between 5° and 40° C. If, after extraction, the insoluble fractions are separated from the solution, i.e. the extract proper, by centrifuging at approximately 2000 to 5000 G for example, it is found that the extracted proteins, i.e. the proteins in solution, may represent approximately 50 to 80% by weight of the total proteins of the starting material. This percentage falls drastically at temperatures upwards of about 50° C as a result of thermal degradation of the proteins. Finally, it should be noted that, if extraction is carried out for longer than about 15 minutes, very little is obtained in the way of an increase in the extraction yield obtained up to that point.

Neutralisation of the extract obtained after separation of the insoluble fractions may be carried out at a temperature below approximately 50° C although it is preferably carried out at ambient temperature. There is no advantage to be gained in working at a temperature above ambient temperature because it has been found that, beyond 20° C, there is a progressive reduction of the order of a few percent in the yield of soluble proteins obtainable at a neutral pH. It is essential to carry out neutralisation rapidly by means of a concentrated alkali. To this end, it is possible to use potassium hydroxide or sodium hydroxide for example. It is possible to keep at least about 98% of the soluble proteins of the acid extract in soluble form at a neutral pH providing the extract is neutralised in less than about 2 seconds by the addition of an alkali in a concentration of approximately 0.5 N or in less than about 20 seconds for a concentration of around 5 N. Effective and practical values of the order of 5 seconds can be recommended for the duration of the neutralisation process, and of the order of 1 N for the concentration of the alkali. Any increase in the duration of the process and any decrease in the concentration of the alkali above and below the limits indicated may be reflected in a serious reduction in the percentage of soluble proteins obtainable at a neutral pH in relation to the soluble proteins of the acid extract. This percentage may fall appreciably for a neutralisation time twice as long or for a ten times greater dilution. The two effects are cumulative.

The invention is illustrated by the following Examples:

EXAMPLE 1

100 g of defatted soya flour of white commercial quality (such as marketed by the American Company "Central Soya" under the name "Soya Fluff") are extracted for 20 minutes at ambient temperature in 900 ml of a dilute aqueous phosphoric acid solution at pH 2.7. After centrifuging at 4000 G, a supernatant phase or acid extract is obtained which contains 58% of the total proteins of the non-extracted flour in soluble form. 5 N sodium hydroxide is then added dropwise to the extract at ambient temperature, the pH thus being adjusted from 2.7 to 7 in 10 seconds. The neutral product obtained contains 99.7% of the proteins of the acid extract in soluble form, i.e. again 58% of the total proteins of the non-extracted flour.

EXAMPLE 2

Extraction is carried out in the same way as described in Example 1, but at a temperature of 10° C. The extract obtained contains 58.8% of the total proteins in the nonextracted flour in soluble form. The extract is neutralised in the same way as in Example 1, but at 10° C. All the proteins of the extract reappear in soluble form in the neutral product obtained.

EXAMPLE 3

Extraction is carried out in the same way as described in Example 1, but at a temperature of 40° C. The extract obtained contains 54.5% of the total proteins in the nonextracted flour in soluble form. The extract is neutralised in the same way as in Example 1, but at a temperature of 40° C. The neutral product obtained contains 96% of the proteins of the acid extract in soluble form.

EXAMPLE 4

Soya flour defatted with hexane is extracted for 20 minutes at 20° C in a dilute aqueous phosphoric acid solution at pH 2.7. After centrifuging at 4000 g, an acid extract is obtained which contains 72% of the total proteins in the non-extracted flour in soluble form. 5 N sodium hydroxide is added to the extract all at once in about 3 seconds in the quantity required to neutralise it. The neutral product obtained contains 99% of the proteins of the acid extract in soluble form.

EXAMPLE 5

Extraction is carried out in the same way as described in Example 1. The extract obtained contains 60% of the total proteins in the non-extracted flour in soluble form. 5 N potassium hydroxide is added to the extract all at once in about 3 seconds in the quantity required to neutralise it. The neutral product obtained contains all the proteins of the acid extract in soluble form.

EXAMPLES 6 to 16

White commercial-grade defatted soya flour is extracted over a period of 20 minutes at ambient temperature in a dilute aqueous phosphoric acid solution at pH 2.7. After centrifuging for 15 minutes at 4000 g, a supernatant phase or acid extract is obtained which contains 60% of the total proteins in the non-extracted flour in soluble form. Sodium hydroxide in different concentrations is added to aliquot portions of the extract which are neutralised from pH 2.7 to pH 7 in different times. Each aliquot portion is neutralised to pH 7 with sodium hydroxide of a given concentration which is added uniformly over a given period of time.

The results of ten of the most significant of these tests are set out in the following Table:

| Example No. | Concentration of the NaOH solution (N) | Neutralisation time (seconds) | Soluble proteins in the aliquot portion neutralised (%) |
| --- | --- | --- | --- |
| 6 | 0.5 | 1 | 100 |
| 7 | 0.5 | 10 | 93 |
| 8 | 0.5 | 20 | 80 |
| 9 | 1 | 1 | 100 |
| 10 | 1 | 10 | 99 |
| 11 | 1 | 20 | 95 |
| 12 | 1 | 30 | 78 |
| 13 | 5 | 10 | 100 |
| 14 | 5 | 20 | 98 |
| 15 | 5 | 30 | 95 |
| 16 | 5 | 60 | 70 |

We claim:
1. A process for the preparation of a soluble fraction of soya proteins which comprises treating defatted soya flour in aqueous medium at a pH value below the isoelectric point of soya protein to obtain an acid extract of soya proteins containing at least about 50% by weight of the total proteins of the starting material, and neutralising the acid extract in a time of less than about 60 seconds by the addition of alkali in a concentration of higher than about 0.1 N.

2. A process as claimed in claim 1, wherein the extract is neutralised at a temperature below about 50° C.

3. A process as claimed in claim 1, wherein the extract is neutralised with sodium hydroxide or potassium hydroxide.

4. A process as claimed in claim 1, wherein the proteins are extracted in a dilute aqueous phosphoric acid solution.

5. A process as claimed in claim 1, wherein the acid extract is neutralised in less than about 10 seconds by the addition of alkali in a concentration of higher than about 1 N.

6. A process as claimed in claim 1, wherein the acid extract is neutralised in less than about 2 seconds by the addition of alkali in a concentration of higher than about 0.5 N.

7. A process as claimed in claim 1, wherein the acid extract is neutralised in less than about 20 seconds by the addition of alkali in a concentration of higher than about 5 N.

8. A soluble fraction of soya proteins when prepared by a process as claimed in claim 1.

* * * * *

UNITED STATES PATENT AND TRADEMARK OFFICE
CERTIFICATE OF CORRECTION

PATENT NO. : 4,064,119
DATED : December 20, 1977
INVENTOR(S) : Jan Kruseman

It is certified that error appears in the above-identified patent and that said Letters Patent are hereby corrected as shown below:

Page 1, FOREIGN APPLICATION PRIORITY DATA SHOULD READ

-- March 27, 1975, Switzerland . . . . . . . . . . 3937/75 --

Signed and Sealed this

Twenty-seventh Day of June 1978

[SEAL]

Attest:

RUTH C. MASON
*Attesting Officer*

DONALD W. BANNER
*Commissioner of Patents and Trademarks*